US012750403B2

(12) United States Patent
Da Silva et al.

(10) Patent No.: US 12,750,403 B2
(45) Date of Patent: Sep. 29, 2026

(54) INITIAL SECURITY ACTIVATION FOR MEDIUM ACCESS CONTROL LAYER

(71) Applicant: TELEFONAKTIEBOLAGET LM ERICSSON (PUBL), Stockholm (SE)

(72) Inventors: Icaro Leonardo Da Silva, Stockholm (SE); Prajwol Kumar Nakarmi, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 18/847,638

(22) PCT Filed: Mar. 17, 2022

(86) PCT No.: PCT/IB2022/052440

§ 371 (c)(1),
(2) Date: Sep. 16, 2024

(87) PCT Pub. No.: WO2023/175378

PCT Pub. Date: Sep. 21, 2023

(65) Prior Publication Data

US 2025/0202939 A1 Jun. 19, 2025

(51) Int. Cl.

*H04L 29/06* (2006.01)
*H04L 9/06* (2006.01)
*H04L 9/40* (2022.01)
*H04W 12/106* (2021.01)

(52) U.S. Cl.

CPC .......... *H04L 63/164* (2013.01); *H04L 9/0618* (2013.01); *H04W 12/106* (2021.01)

(58) Field of Classification Search

CPC ..... H04L 63/164; H04L 63/20; H04L 9/0618; H04L 12/106

See application file for complete search history.

(56) References Cited

U.S. PATENT DOCUMENTS 11,051,354 B2 * 6/2021 Teyeb .................. H04W 76/19
11,070,981 B2 * 7/2021 Lee ....................... H04W 12/10

FOREIGN PATENT DOCUMENTS

WO 2007108651 A1 9/2007
WO 2020198234 A1 10/2020

OTHER PUBLICATIONS

"3rd Generation Partnership Project; Technical Specification Group Radio Access Network; NR; Radio Resource Control (RRC) protocol specification (Release 16)", 3GPP TS 38.331 V16.7.0, Dec. 2021, 963 pages.

* cited by examiner

*Primary Examiner* — Longbit Chai

(74) *Attorney, Agent, or Firm* — Murphy, Bilak & Homiller, PLLC

(57) ABSTRACT

A user equipment receives a first message for initial Access Stratum (AS) security activation via a higher layer protocol, wherein the first message includes configuration information for security in a lower layer protocol and the first message is included in a second message of the lower layer protocol. In response to receiving the first message, the UE derives an integrity key for the lower layer protocol based on the configuration information, and it performs an integrity check on the second message based on the derived integrity key.

24 Claims, 14 Drawing Sheets

INITIAL SECURITY ACTIVATION FOR MEDIUM ACCESS CONTROL LAYER

PRIORITY CLAIM

This application is a national stage application of International Patent Application No. PCT/IB2022/052440, filed Mar. 17, 2022, the disclosure disclosures of which is hereby incorporated in its entirety by reference.

TECHNICAL FIELD

The disclosed subject matter relates generally to telecommunications. Certain embodiments relate more particularly to concepts such as Medium Access Control (MAC) layer security, Radio Resource Control (RRC), layer 3 (L3), initial security activation, 6G and/or 5G.

BACKGROUND

In a 5G system (5GS), Access Stratum (AS) security is a function performed at the Packet Data Convergence Protocol (PDCP) layer. At the PDCP layer, a User Equipment (UE) performs the following security functions:

- Ciphering (also called encryption) of data, e.g., PDCP Protocol Data Units (PDUs), to be transmitted e.g., in the Uplink (UL);
- Deciphering (also called decryption) of PDCP PDUs received in the Downlink (DL);
- Integrity protection of PDCP data to be transmitted in the UL; and.
- Integrity verification of PDCP data received in the DL.

The PDCP layer (or sub-layer, as it may also be called) is used for the User Plane (UP) and the Control Plane (CP). Accordingly, PDCP PDUs are generated for both UP data to be transmitted/received (e.g., Internet Protocol packet from application layer) and CP messages, e.g., RRC messages.

Figures (FIGS. 1 and 2 illustrate UP and CP protocol stacks for the 5G New Radio (NR) air interface, between the UE and a gNodeB (gNB). More specifically, FIG. 1 illustrates the UP-protocol stack and FIG. 2 illustrates the CP protocol stack.

To perform security functions at the PDCP layer in 5G NR, security must be activated (or initiated). This activation is performed in an RRC procedure called RRC Security Mode Command (SMC), which is triggered during a transition from IDLE state to CONNECTED state, as shown in FIG. 3.

Referring to FIG. 3, in operations 7/7*a*, the gNB activates AS security with the UE. RRC messages in operations 1 and 2 use a signaling radio bearer (SRB) SRB0, and subsequent RRC messages use SRB1.

Messages in operations 7/7*a* are integrity protected. From operation 8 on, all messages are integrity protected and ciphered. Further details of the SMC procedure for AS security can be found, e.g., in 3GPP TS 38.331, V16.7.0, Sec. 5.3.4.

As shown in FIG. 2, with the CP protocol stack, the UE also has a Non-Access Stratum (NAS) protocol layer for communication with an Access and Mobility Management Function (AMF) in the 5G Core Network (5GC). At the UE NAS layer, there are also security functions. However, separate AS and NAS level Security Mode Command (SMC) procedures are used.

Unfortunately, cellular networks may have security vulnerabilities in the MAC layer/sublayer in the protocol stack of the air interface. In the current 5G NR air interface, security is performed only at the PDPC layer, i.e., the MAC layer data is not encrypted/ciphered and/or integrity protected. These vulnerabilities in the MAC layer may lead to different types of attacks to the base station (and consequently to the overall system/area) and/or to the UE, such as the following:

i) Radio Resource Draining by fake Buffer Status Reporting (BSR);
ii) Prolonged Packet Delivery by fake Discontinuous Reception (DRX) command;
iii) Flexible Throughput Limiting by fake Power Headroom (PHR);
iv) retrieval of Device Localization by retrieval of Timing Advance (TA) command;
v) Packet delivery loop using fake negative acknowledgement (NACK) in Radio Link Control (RLC) layer; and
vi) Connection reset using fake Access Stratum Release Assistance Indication (AS RAI).

It has been proposed that the MAC layer should derive new keys to protect data-plane signaling with the following characteristics:

- The keys must differ from those used in PDCP;
- The generation of keystream must use parameters other than PDCP Sequence Number (SN);
- MAC encrypts and integrity protects each MAC control element and RLC control; and
- The same key hierarchy is used i.e., based on $K_{eNB}$.

It has been unclear, however, how such security should be activated or started at the MAC layer e.g., which procedure is used, which protocol layer is used, etc. Existing AS security is associated to the PDCP layer and the existing initial security activation procedure in RRC is only defined for the PDCP layer, i.e., it does not work for the MAC layer security.

SUMMARY

In certain embodiments of the disclosed subject matter, a UE receives an RRC message including a MAC layer security configuration (e.g., indication of integrity and/or encryption algorithm), derives MAC integrity keys and performs integrity check in the MAC Protocol Data Unit (PDU) that carries the RRC message, as part of a MAC Service Data Unit (SDU).

In such embodiments, it may be possible to activate MAC security during an IDLE to CONNECTED transition, possibly jointly with the security activation for PDCP. That may allow MAC security to be up and running for a UE in CONNECTED state, preventing or mitigating the possibility for the security attacks at the MAC layer. Because a modified version of the initial security activation procedure in RRC is used, enhanced with some security related actions at the MAC layer, a single procedure may be used for security activation in the AS, which speeds up the transition to CONNECTED from IDLE.

Embodiments of the disclosed subject matter may provide benefits in various contexts, including but not limited to both 5G and 6G systems. In 5G systems, for instance, there has been an increase in the number of functionalities performed by the MAC layer, since the late releases of LTE, to 5G NR, and the 5G evolution; in 5G advanced, inter-cell mobility based on MAC layer messages is going to be supported, so that security in MAC becomes more and more relevant. Similarly, in 6G, more sensitive functions enabled by MAC layer messages are expected, so that MAC security becomes even more important.

In some embodiments, a method performed by a UE comprises receiving a first message for initial AS security activation via a higher layer protocol, wherein the first message includes configuration information for security in a lower layer protocol and the first message is included in a second message of the lower layer protocol. The method further comprises, in response to receiving the first message, deriving an integrity key for the lower layer protocol based on the configuration information, and performing an integrity check on the second message based on the derived integrity key.

In certain related embodiments, the higher layer protocol is an RRC protocol, the lower layer protocol is a MAC protocol, and the second message comprises a MAC PDU.

In certain related embodiments, the method further comprises determining whether the integrity check failed, and in response to determining that the integrity check failed, transmitting an RRC message indicating a security failure.

In certain related embodiments, the method further comprises determining whether the integrity check succeeded, and in response to determining that the integrity check succeeded, transmitting subsequent MAC PDUs with integrity protection. In some such embodiments, the method further comprises, in response to determining that the integrity check succeeded, transmitting an RRC complete message with a MAC PDU that is integrity protected.

In certain related embodiments, the configuration information comprises an indication of at least one integrity protection algorithm for MAC layer security and/or an indication of at least one encryption and/or ciphering algorithm for the MAC layer security. In some such embodiments, the method further comprises deriving a key associated with a network node, to be used at least for MAC layer security, and deriving at least one integrity protection key for MAC layer messages based on the key associated with the network node and the indication of at least one integrity protection algorithm for the MAC layer security. In some such embodiments, the method further comprises deriving a key associated with a network node, to be used at least for MAC layer security, and deriving at least one encryption and/or ciphering key for MAC layer messages based on the key associated with the network node and the indication of at least one encryption and/or ciphering algorithm.

In some embodiments, a method performed by a network node comprises transmitting a first message for initial AS security activation via a higher layer protocol, wherein the first message includes configuration information for security in a lower layer protocol and the first message is included in a second message of the lower layer protocol. The method further comprises deriving an integrity key for the lower layer protocol based on the configuration information, and integrity protecting the second message based on the derived integrity key.

In certain related embodiments, the higher layer protocol is an RRC protocol, the lower layer protocol is a MAC protocol, and the second message comprises a MAC PDU. In some such embodiments, the method further comprises, in response to a user equipment (UE) failing an integrity check on the second message, receiving an RRC message indicating a security failure.

In certain related embodiments, the method further comprises, in response to a UE successfully performing an integrity check on the second message, receiving an RRC complete message having an integrity protected MAC PDU.

In certain related embodiments, the configuration information comprises an indication of at least one integrity protection algorithm for MAC layer security and/or an indication of at least one encryption and/or ciphering algorithm for the MAC layer security. In some such embodiments, the method further comprises deriving at least one integrity protection key for MAC layer messages based on a key associated with a network node and the indication of at least one integrity protection algorithm for the MAC layer security. In some such embodiments, the method further comprises deriving at least one encryption and/or ciphering key for MAC layer messages based on a key associated with a network node and the indication of at least one encryption and/or ciphering algorithm.

In some embodiments, a UE or network node comprises processing circuitry and memory collectively configured to perform one or more methods as described above.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
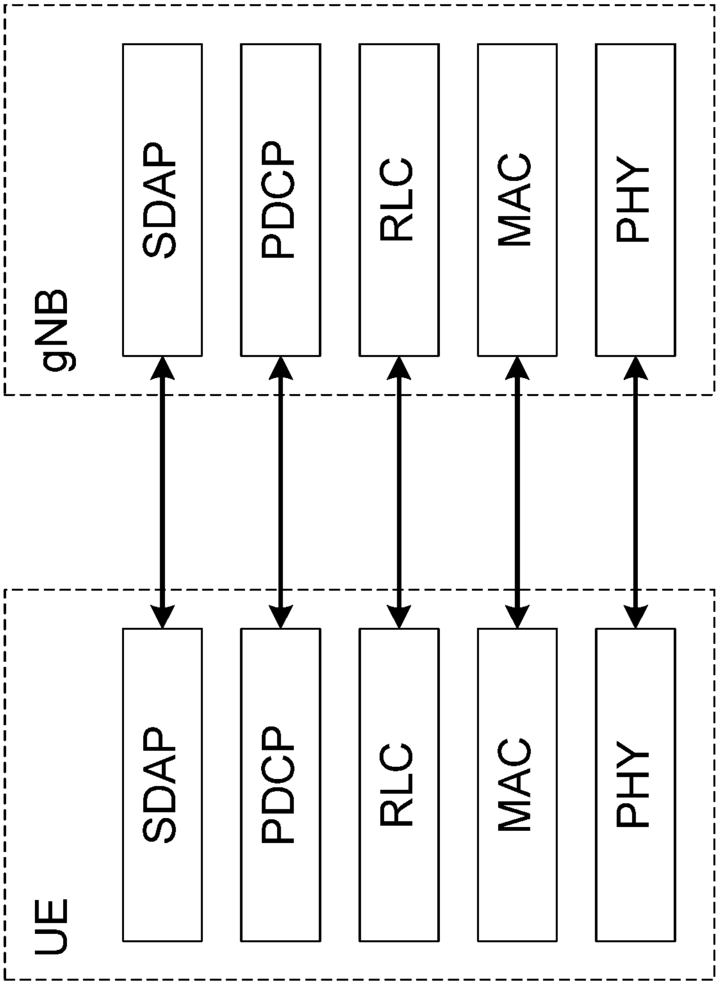
FIG. 1 illustrates a UP protocol stack.
Figure 2:
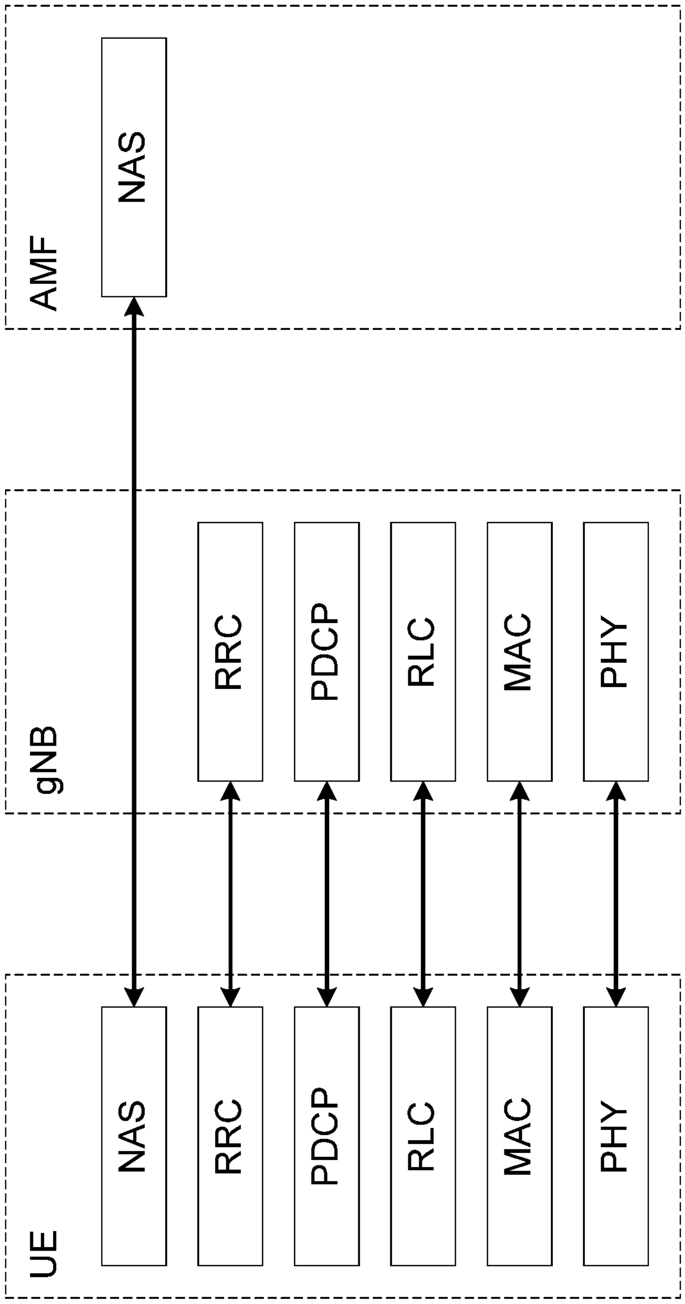
FIG. 2 illustrates a CP protocol stack.
Figure 3:
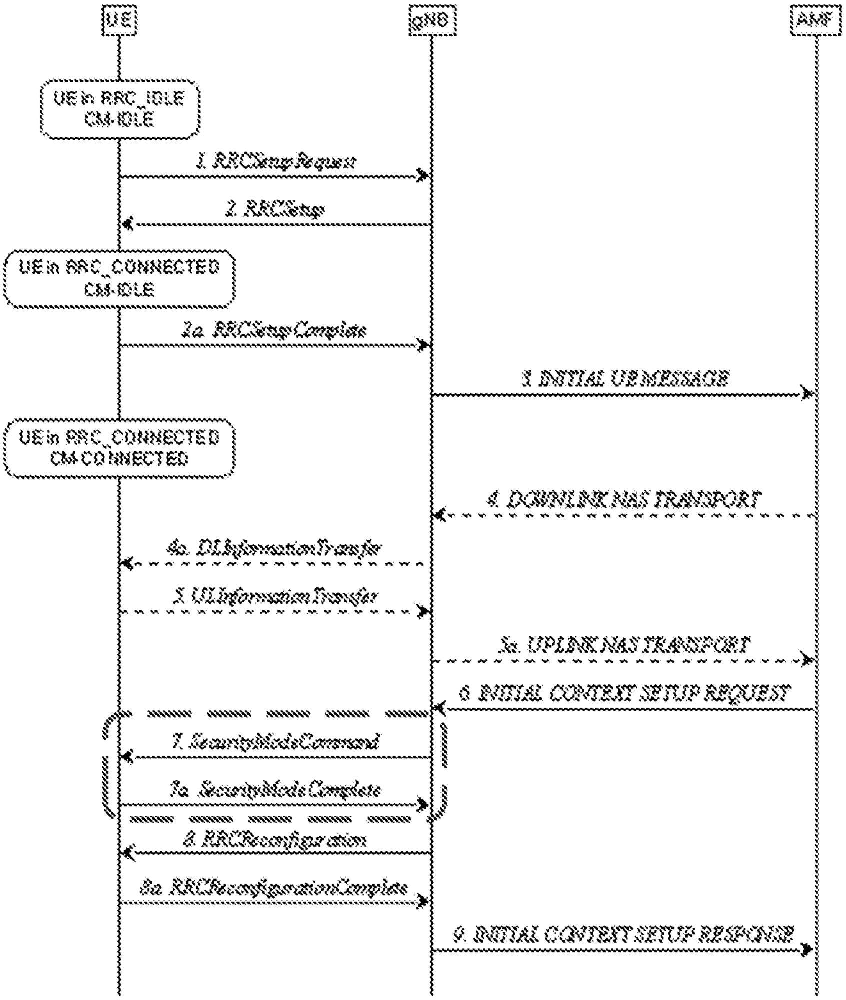
FIG. 3 illustrates activation of security in relation to a transition from an IDLE state to a CONNECTED state.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

In the description that follows, the acronym "MAC" refers to the MAC protocol layer and stands for Medium Access Control (MAC). The acronym MAC-I refers to a Message Authentication Code for Integrity (MAC-I) and refers to bits/bytes associated to a message to indicate integrity. PDU refers to Protocol Data Unit and SDU refers to Service Data Unit. Service Data unit (SDU) refers to packets that are received by a protocol layer, while Protocol Data unit (PDU) refers to packets that are output from a protocol layer after adding the protocol layer's header to the SDU, for example IP Layer submits PDCP SDUs (IP Packets) to the PDCP layer. PDCP layer does header compression and adds PDCP header to these PDCP SDUs. PDCP Layer submits PDCP PDUs (RLC SDUs) to RLC layer.

The disclosed subject matter provides, among other things, methods, apparatuses, and systems related to MAC layer security activation, based on an RRC procedure. In some embodiments, a UE receives an RRC message including a MAC layer security configuration (e.g., an indication of integrity and/or encryption algorithm), derives MAC integrity keys, and performs an integrity check in the MAC Protocol Data Unit (PDU) which carries the RRC message, as part of a MAC Service Data Unit (SDU). The UE may perform certain additional actions if the MAC PDU carrying the RRC message passes the check, such as transmitting a MAC PDU which is also integrity protected. It may also perform certain additional actions if the MAC PDU carrying the RRC message does not pass the integrity check, such as transmitting a failure message in RRC and/or MAC layer.

In some embodiments, a network node for MAC layer security activation may also perform certain operations based on an RRC procedure. For instance, in some embodiments, the network node sends to a UE an RRC message including MAC layer security configuration (e.g., indication of integrity and/or encryption algorithm), derives MAC integrity keys, and integrity protects the MAC Protocol Data Unit (PDU) which carries the RRC message to the UE.

In some embodiments, a method at a UE for MAC layer security activation comprises receiving a first message of a higher layer protocol layer (e.g., RRC) for initial AS security activation, wherein the message includes a configuration for security in a lower layer protocol layer (e.g., MAC), and the first message is encapsulated in a second message of a lower layer protocol message (e.g., MAC PDU); deriving an integrity key for the lower layer protocol based on the configuration for security in the lower layer protocol layer, in response to receiving the first message; and performing an integrity check in the second message of a lower layer protocol message, based on the derived integrity key for the lower layer protocol.

Additional embodiments may include certain UE actions that depend on whether the second message passes or fails the integrity check, or UE actions performed as part of the MAC security activation such as derivation of encryption keys and determination of which first messages on the MAC layer shall be encrypted and/or integrity protected.

In some embodiments, a method at a network node for MAC layer security activation comprises transmitting to a UE a first message of a higher layer protocol layer (e.g., RRC) for initial AS security activation, wherein the message includes a configuration for security in a lower layer protocol layer (e.g., MAC), and the first message is encapsulated in a second message of a lower layer protocol message (e.g., MAC PDU); deriving an integrity key for the lower layer protocol based on the configuration for security in the lower layer protocol layer, in response to receiving the first message; and integrity protecting the second message of a lower layer protocol message, based on the derived integrity key for the lower layer protocol.

The described embodiments may be implemented in any appropriate type of communication system supporting any suitable communication standards and using any suitable components. As one example, certain embodiments may be implemented in a communication system such as that illustrated in FIG. 4. Although certain embodiments are described with respect to 3GPP systems and related terminology, the disclosed concepts are not limited to such systems.

Figure 4:
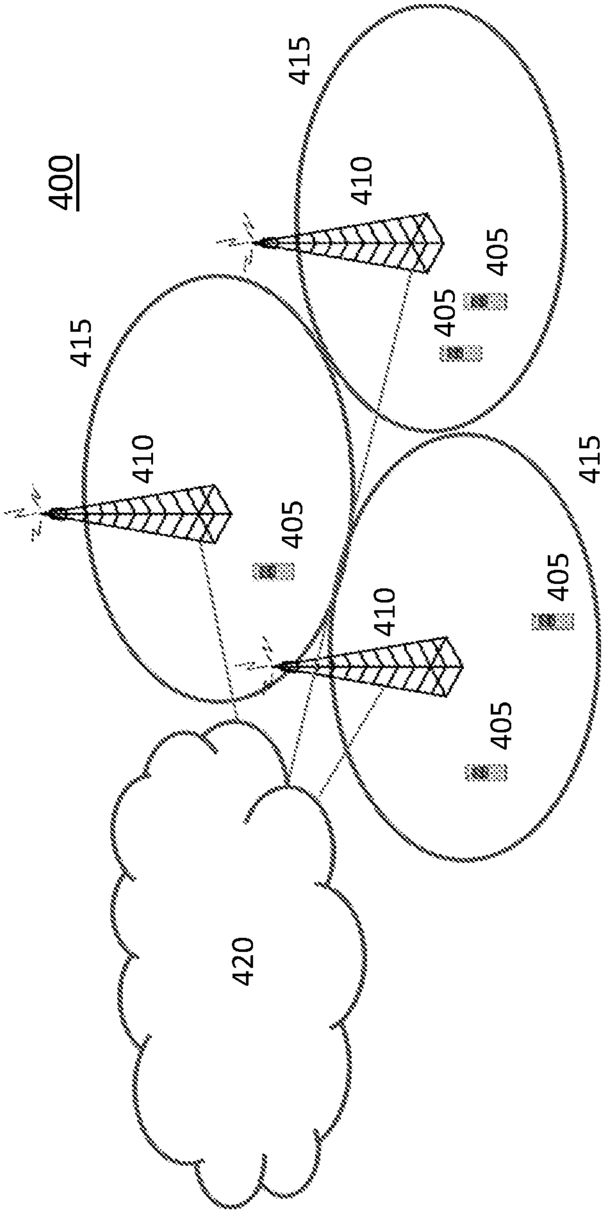
FIG. 4 illustrates a communication system according to some embodiments of the disclosed subject matter.

Referring to FIG. 4, a communication system 400 comprises a plurality of wireless communication devices 405 (e.g., UEs, machine type communication [MTC]/machine-to-machine [M2M] UEs) and a plurality of radio access nodes 410 (e.g., gNodeBs or other base stations). Communication system 400 is organized into cells 415, which are connected to a core network 420 via corresponding radio access nodes 410. Radio access nodes 410 are capable of communicating with wireless communication devices 405 along with any additional elements suitable to support communication between wireless communication devices or between a wireless communication device and another communication device.

Figure 5:
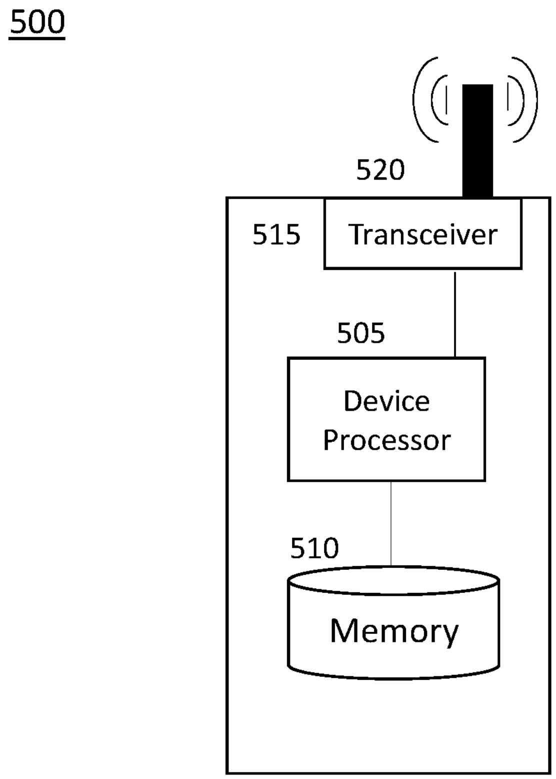
FIG. 5 illustrates a wireless communication device according to some embodiments of the disclosed subject matter.

Although wireless communication devices 405 may represent communication devices that include any suitable combination of hardware and/or software, these wireless communication devices may, in certain embodiments, represent devices such as that illustrated in greater detail by FIG. 5. Similarly, although the illustrated radio access node may represent network nodes that include any suitable combination of hardware and/or software, these nodes may, in particular embodiments, represent devices such those illustrated in greater detail by FIGS. 6A and 6B.

Referring to FIG. 5, a wireless communication device 500 comprises a processor 505 (e.g., Central Processing Units [CPUs], Application Specific Integrated Circuits [ASICs], Field Programmable Gate Arrays [FPGAs], and/or the like), a memory 510, a transceiver 515, and an antenna 520. In certain embodiments, some or all of the functionality described as being provided by UEs, MTC or M2M devices, and/or any other types of wireless communication devices may be provided by the device processor executing instructions stored on a computer-readable medium, such as memory 510. Alternative embodiments may include additional components beyond those shown in FIG. 5 that may be responsible for providing certain aspects of the device's functionality, including any of the functionality described herein.

Figure 6A:
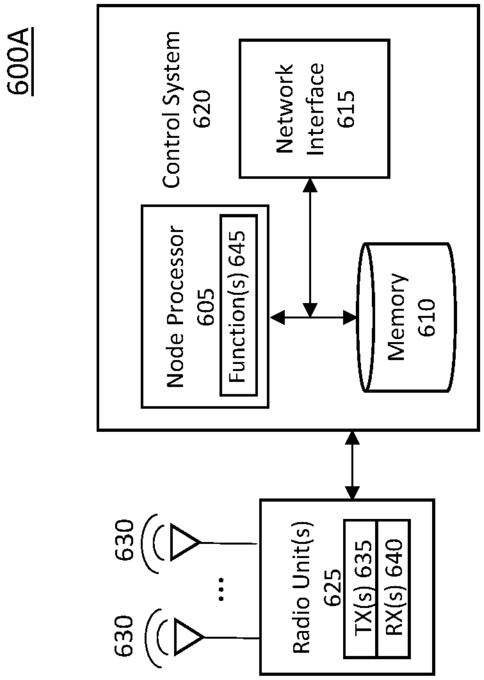
FIG. 6A illustrates a radio access node according to some embodiments of the disclosed subject matter.

Referring to FIG. 6A, a radio access node 600A comprises a control system 620 that comprises a node processor 605 (e.g., Central Processing Units (CPUs), Application Specific Integrated Circuits (ASICs), Field Programmable Gate Arrays (FPGAs), and/or the like), memory 610, and a network interface 615. In addition, radio access node 600A comprises at least one radio unit 625 comprising at least one transmitter 635 and at least one receiver coupled to at least one antenna 630. In some embodiments, radio unit 625 is external to control system 620 and connected to control system 620 via, e.g., a wired connection (e.g., an optical cable). However, in some other embodiments, radio unit 625 and potentially antenna 630 are integrated together with control system 620. Node processor 605 operates to provide at least one function 645 of radio access node 600A as described herein. In some embodiments, the function(s) are implemented in software that is stored, e.g., in the memory 610 and executed by node processor 605.

In certain embodiments, some or all of the functionality described as being provided by a base station and/or any other type of network node may be provided by node processor 605 executing instructions stored on a computer-readable medium, such as memory 610 shown in FIG. 6A. Alternative embodiments of radio access node 600A may comprise additional components to provide additional functionality, such as the functionality described herein and/or related supporting functionality.

Figure 6B:
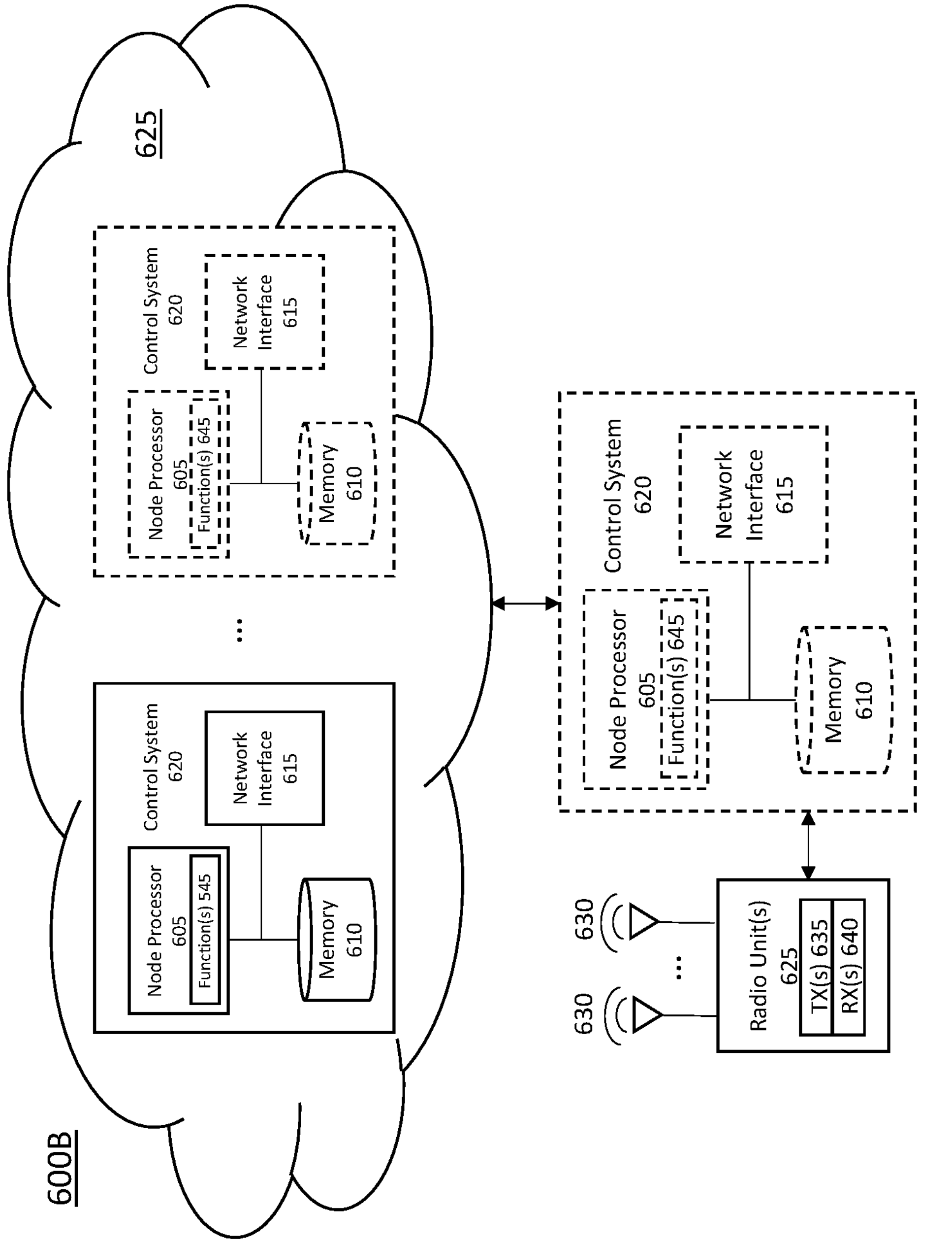
FIG. 6B illustrates a radio access node according to some embodiments of the disclosed subject matter.

FIG. 6B is a block diagram that illustrates a virtualized radio access node 600B according to an embodiment of the disclosed subject matter. The concepts described in relation to FIG. 6B may be similarly applied to other types of network nodes. Moreover, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 6B, radio access node 600B comprises control system 620 as described in relation to FIG. 6A. Control system 620 is connected to one or more processing nodes 620 coupled to or included as part of a network(s) 625 via network interface 615. Each processing node 620 comprises one or more processors 605 (e.g., CPUs, ASICs, FPGAS, and/or the like), memory 610, and a network interface 615.

In this example, functions 645 of radio access node 600B described herein are implemented at the one or more processing nodes 620 or distributed across control system 620 and the one or more other processing nodes in any desired manner. In some embodiments, some or all of the functions 645 of radio access node 600B described herein are implemented as virtual components executed by one or more virtual machines implemented in a virtual environment(s) hosted by processing node(s) 620. As will be appreciated by one of ordinary skill in the art, additional signaling or communication between processing node(s) 620 and control system 620 is used in order to carry out at least some of the desired functions 645. As indicated by dotted lines, in some embodiments control system 620 may be omitted, in which case the radio unit(s) 625 communicate directly with processing node(s) 620 via appropriate network interface(s).

In some embodiments, a computer program comprises instructions that, when executed by at least one processor, cause at least one processor to carry out the functionality of a radio access node or another node implementing one or more of the functions of the radio access node in a virtual environment according to any of the embodiments described herein.

Figure 7:
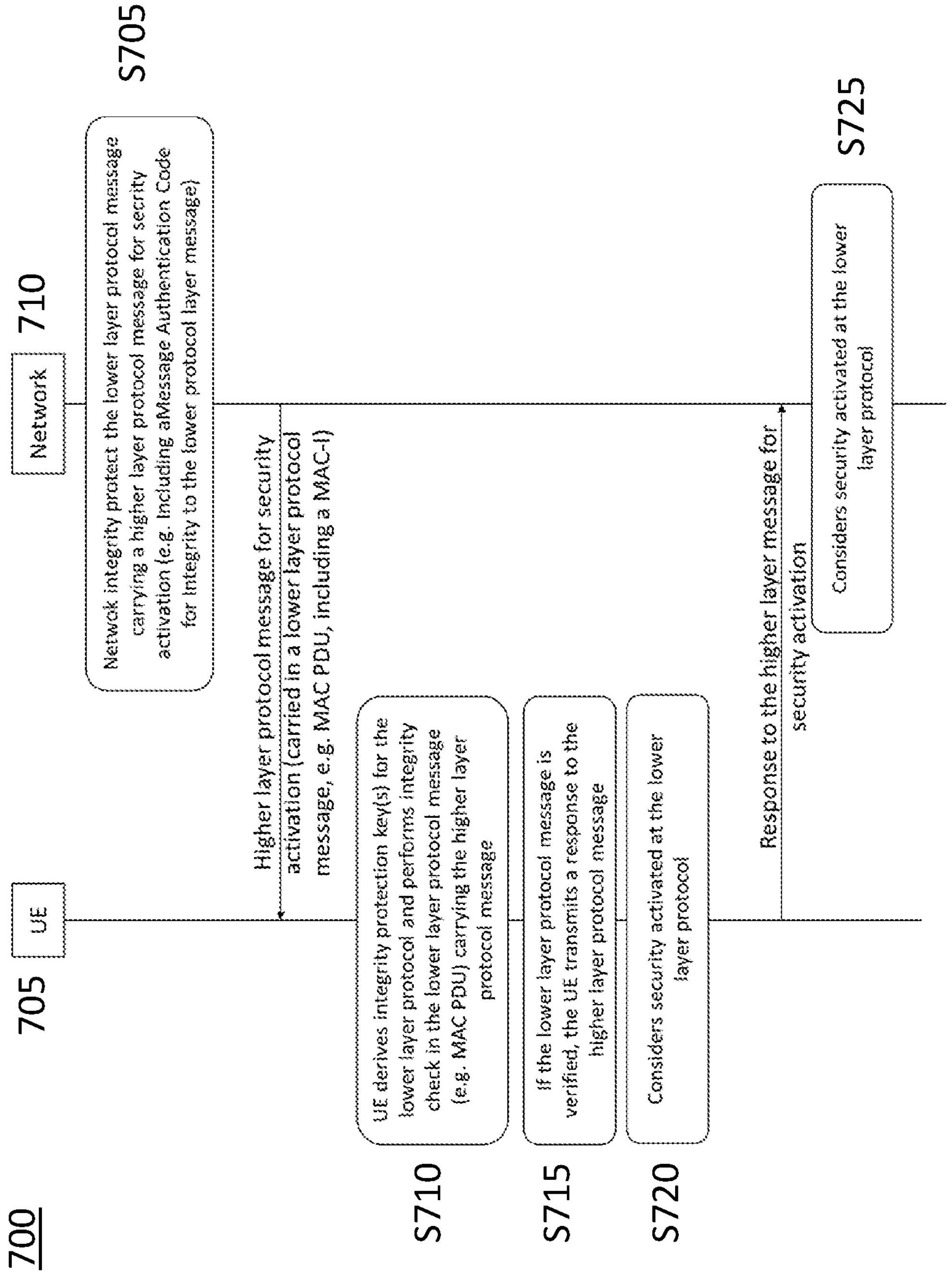
FIG. 7 illustrates a signaling flow for a method according to some embodiments of the disclosed subject matter.

FIG. 7 illustrates a signaling flow for a method 700 according to some embodiments of the disclosed subject matter. In the method of FIG. 7, a network node 710 integrity protects a lower layer protocol message (e.g., a MAC PDU) that is sent in a higher layer protocol message (e.g., an RRC message) to a UE 705 to activate security. The integrity protection involves including a Message Authentication Code for Integrity (MAC-I) as part of the lower layer protocol message, where the MAC-I is calculated based on an integrity key and at least a part of the lower layer protocol message. In 5G NR (or e.g., future 6G radio access technology, RAT), the physical layer design allows more bandwidth than legacy RATs and therefore additional space (number of bits) required to transmit MAC-I in the MAC layer should be feasible.

Referring to FIG. 7, the method 700 comprises the network node 710 integrity protecting the lower layer protocol message (S705), including the integrity protected message in the higher layer protocol message, and sending the resulting message to the UE 705. The message further comprises the UE deriving integrity protection key(s) for the lower layer protocol message and performing an integrity check based on the derived integrity protection key(s) (S710). If the integrity check is successful, the UE transmits a response to the higher layer protocol message (S715) and considers security to be activated at the lower layer protocol (S720). Upon receiving the response, the network node 710 also considers security to be activated at the lower layer protocol (S725).

In a first group of embodiments, an RRC procedure between the UE and a RAN node/function is used to initiate security in the MAC layer.

From the UE perspective the operations for such procedures may include, e.g., the following:

i) The UE receiving from a network node (e.g., a RAN network node such as a gNodeB) an RRC message (such as a Security Mode Command message e.g., SecurityModeCommand as defined in TS 38.331) including an indication of at least one integrity protection algorithm for the MAC layer security and/or an indication of at least one encryption/ciphering algorithm for the MAC layer security;

ii) The UE deriving a key associated to a network node ($K_{Node}$) to be used at least for MAC layer security; and iii) The UE deriving at least one integrity protection key for MAC layer messages ($K_{MACInt}$) based on the key associated to a network node ($K_{Node}$) and an indication of at least one integrity protection algorithm for the MAC layer security indicated in the RRC message; and/or iv) the UE deriving at least one encryption/ciphering key for MAC layer messages ($K_{MACEnc}$) based on the key associated to a network node ($K_{Node}$) and an indication of at least one encryption/ciphering algorithm for the MAC layer security.

From the network perspective, the operations for such procedures may include, e.g., the following:

i) The network node transmitting to the UE the RRC message (such as a Security Mode Command message e.g., SecurityModeCommand as defined in TS 38.331) including an indication of at least one integrity protection algorithm for the MAC layer security and/or an indication of at least one encryption/ciphering algorithm for the MAC layer security;

ii) The network node deriving a key associated to a network node ($K_{Node}$) to be used at least for MAC layer security at the network side; and thereafter, iii) The network node deriving at least one integrity protection key for MAC layer messages ($K_{MACInt}$) based on the key associated to a network node ($K_{Node}$) and an indication of at least one integrity protection algorithm for the MAC layer security which it has indicated in the RRC message; and/or iv) the network node deriving at least one encryption/ciphering key for MAC layer messages ($K_{MACEnc}$) based on the key associated to a network node ($K_{Node}$) and an indication of at least one encryption/ciphering algorithm for the MAC layer security.

The above procedures may comprise deriving only integrity protection keys, only encryption keys, or both integrity protection and ciphering/encryption keys at the UE and network sides, so that both the UE and the network are able to derive the same keys for MAC security, for their secure communication in the downlink and or the uplink in the MAC layer. The operations indicated above for the network actions are not necessarily performed in the indicated order.

In a second group of embodiments, the UE requests (e.g., via the RRC layer, which is the protocol layer where the RRC message is received) the lower layers (internally at the UE e.g., requests the MAC layer) to verify the integrity protection of a MAC PDU carrying the RRC message that has been received (e.g., SMC message), using at least one integrity protection algorithm for the MAC layer security indicated in the RRC message, and at least one integrity protection key for MAC layer messages ($K_{MACInt}$) derived in the procedure. This request is performed in response to and/or after having derived at least one integrity protection key for MAC layer messages ($K_{MACInt}$). One difference with the new operations of the proposed method is that in the existing security activation procedure in TS 38.331, the RRC layer at the UE requests lower layers (i.e., PDCP) to verify the integrity protection of the SecurityModeCommand message, by verifying the integrity protection of the PDCP PDU(s) carrying the SecurityModeCommand message.

In the procedures for the second group of embodiments, lower layer(s) of the UE (e.g., the MAC layer) verify the MAC PDU(s) carrying the RRC message, which could lead to different alternatives, such as the following examples:

a) The UE verifying the integrity protection of both the PDCP PDU(s) carrying the RRC message and, in addition, verifies the integrity protection of the MAC PDU(s) carrying the RRC message;
b) The UE only verifying the integrity protection of the MAC PDU(s) carrying the RRC message, which assumes that MAC integrity protection is sufficient i.e., PDCP integrity protection would not be necessary; and
c) The integrity protection of MAC and/or PDCP being configurable and indicated in the RRC message, so that based on the indication the UE knows whether it performs the integrity protection verification in the MAC PDU(s) and/or in PDCP PDU(s) carrying the RRC message.

According to the second group of embodiments, the network node also derives at least one integrity protection key for the MAC layer ($K_{MACInt}$). The network node considers the RRC message (e.g., SecurityModeCommand) as comprised in a generated MAC SDU; and, based on the generated MAC SDU the network node generates a MAC PDU to be transmitted, wherein the MAC PDU includes at least the MAC SDU and a Message Authentication Code for Integrity (denoted MAC-I* or MAC-IMAC layer), wherein the MAC-I* is calculated based on at least one integrity protection key for the MAC layer ($K_{MACInt}$) and the generated MAC SDU. This is the MAC PDU that needs to be integrity checked by the UE, before MAC security is considered successfully activated at the UE.

Figure 8:
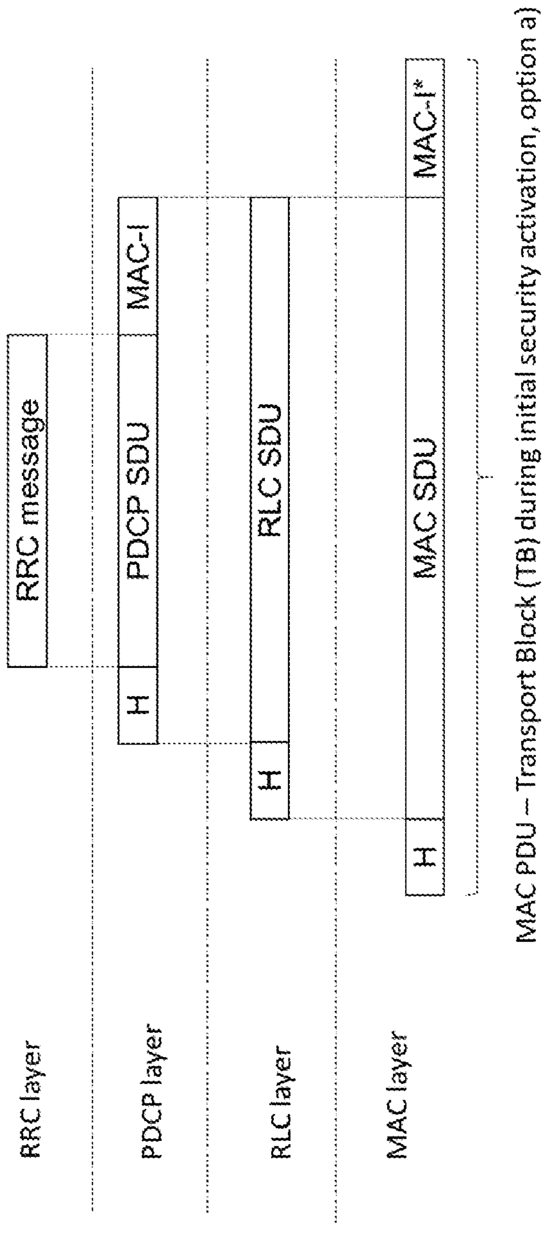
FIG. 8 illustrates a received MAC PDU including a MAC-I* and a PDCP PDU including a MAC-I according to some embodiments of the disclosed subject matter.

FIG. 8 illustrates a received MAC PDU including the MAC-I* and PDCP PDU including the MAC-I. As illustrated in FIG. 8, which corresponds to alternative (a), the UE receives at the PDCP layer the PDCP PDU including the PDCP SDU (comprising the RRC message e.g., SecurityModeCommand), a header (H) and the bits/bytes used for integrity protection, denoted here as MAC-I or MAC-IPDCP layer. In RRC, the UE uses the algorithm configuration in the RRC message to derive the integrity protection key(s) in PDCP layer for RRC messages, to then verify the integrity of the PDCP PDU which carried the message, by verifying the MAC-I received in that PDCP PDU. The UE processes in the MAC layer the received MAC PDU including the MAC SDU, a header (H) and the bits/bytes used for integrity protection (MAC-I* or MAC-IMAC layer). In RRC, the UE uses the algorithm configuration in the RRC message to derive at least one integrity protection key for MAC layer messages ($K_{MACInt}$), to then verify the integrity of the MAC PDU which carried the message, by verifying the MAC-I* received in that MAC PDU.

Figure 9:
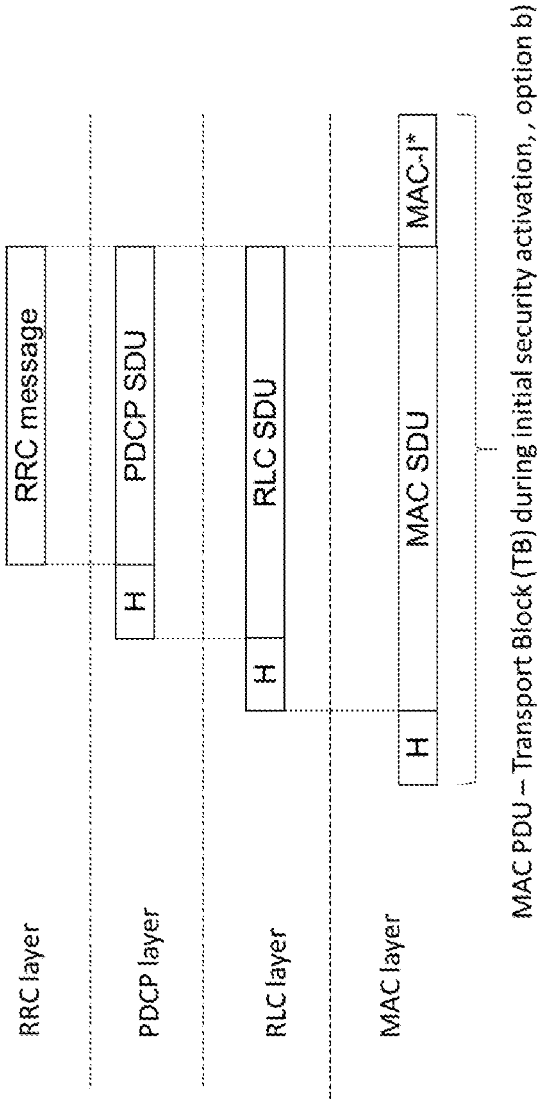
FIG. 9 illustrates a received MAC PDU including a MAC-I* according to some embodiments of the disclosed subject matter.

FIG. 9 illustrates a received MAC PDU including the MAC-I*. As illustrated in FIG. 9, which corresponds to alternative b), the UE receives in the MAC layer the MAC PDU including the MAC SDU, a header (H) and the bits/bytes used for integrity protection (MAC-I*). In RRC, the UE uses the algorithm configuration in the RRC message to derive at least one integrity protection key for MAC layer messages ($K_{MACInt}$), to then verify the integrity of the MAC PDU which carried the message, by verifying the MAC-I* received in that MAC PDU.

As indicated by the foregoing, the data unit in the MAC layer (e.g., the MAC PDU, MAC SDU, MAC SDU+header) that is integrity protected is the MAC PDU header and the data part of the PDU, possibly before ciphering (e.g., MAC SDU). As a result of the RRC procedure in the method, the integrity protection function at the MAC layer is activated. In one option, when MAC security is activated (and not suspended), the integrity protection function is applied to the MAC PDUs including and subsequent to the MAC PDU received with the RRC message. As the MAC PDU carrying the RRC message that activates the MAC integrity protection function is itself integrity protected, with the configuration included in this RRC message, this message must first be decoded by RRC before the integrity protection verification could be performed for the MAC PDU in which the message was received.

In various embodiments, the calculation of the MAC-I* to be included in the MAC PDU carrying the RRC message (or to be verified by the UE for a downlink message) may be performed in various alternative ways. Some examples of inputs to the integrity protection function include the following:

A logical channel identifier, which in the case of initial security activation it would be associated to the Signaling Radio Bearer (SRB1), which is the bearer for the RRC message received for initial security activation;

A MAC layer identifier for the UE, such as a Cell-Radio Network Temporary Identity (C-RNTI), wherein the C-RNTI is assigned during a random access procedure performed before the reception of the RRC message for initial security activation; and One or more keys for MAC integrity protection key e.g., $K_{MACInt}$, derived during the RRC procedure.

At transmission, the UE computes the value of the MAC-I* field, and at reception it verifies the integrity of the MAC PDU carrying the RRC message by calculating the X-MAC* based on the input parameters as specified above. If the calculated X-MAC* corresponds to the received MAC-I*, integrity protection is verified successfully.

Still according to the second group of embodiments, if the RRC message (e.g., SecurityModeCommand message) passes the integrity protection check performed at the MAC layer, one or more of a first set of actions are performed, such as the following examples:

The integrity check being performed at the MAC layer internally at the UE. Hence, if the MAC layer at the UE determines that the integrity check succeeds for the received MAC PDU, the MAC layer indicate the integrity verification success to upper layers (e.g., to RRC).

The UE deriving at least one encryption/ciphering key for MAC layer messages ($K_{MACEnc}$). In this case, the successful integrity check at MAC layer of the RRC message is a trigger (or condition) for the UE to derive encryption/ciphering key for MAC layer. According to this step, it would not make sense to start encryption in the MAC layer before the message is verified.

The UE deriving at least one additional integrity protection key for MAC layer messages. This may be relevant in the case multiple integrity keys are to be derived in the MAC layer, for example, if there is a key for MAC PDUs carrying RRC messages ($K_{MACInt-rrc}$*), and a key for MAC PDUs carrying user plane data ($K_{MACInt-up}$*). According to this step, it would not be necessary to derive further keys, if needed, before the message is verified.

The UE configuring lower layers (e.g., the MAC layer) to apply integrity protection using the indicated algorithm for MAC layer integrity protection and the at least one MAC integrity protection key ($K_{MACInt}$). Applying integrity protection in this context may include including the MAC-I* in MAC PDUs to be transmitted and/or verify the MAC-I* (s) included in a received MAC PDU.

In a first variant, illustrated in FIG. 9, the above operation is performed immediately after the check, i.e., integrity protection in MAC shall be applied to all subsequent MAC messages received and sent by the UE after the reception of the MAC PDU containing the RRC message during MAC security activation (e.g., SecurityModeCommand), which includes the MAC messages to be transmitted by the UE in response to the MAC PDU carrying the RRC message in the initial security activation, e.g., the MAC messages possibly containing the Radio Link Control (RLC) Acknowledgements (ACK/NACKs) to be transmitted to the network would be integrity protected, enabling the network to also verify the UE. At the network node, upon reception of this first MAC PDU integrity protected the network verifies the UE and considers MAC security activated.

Figure 10:
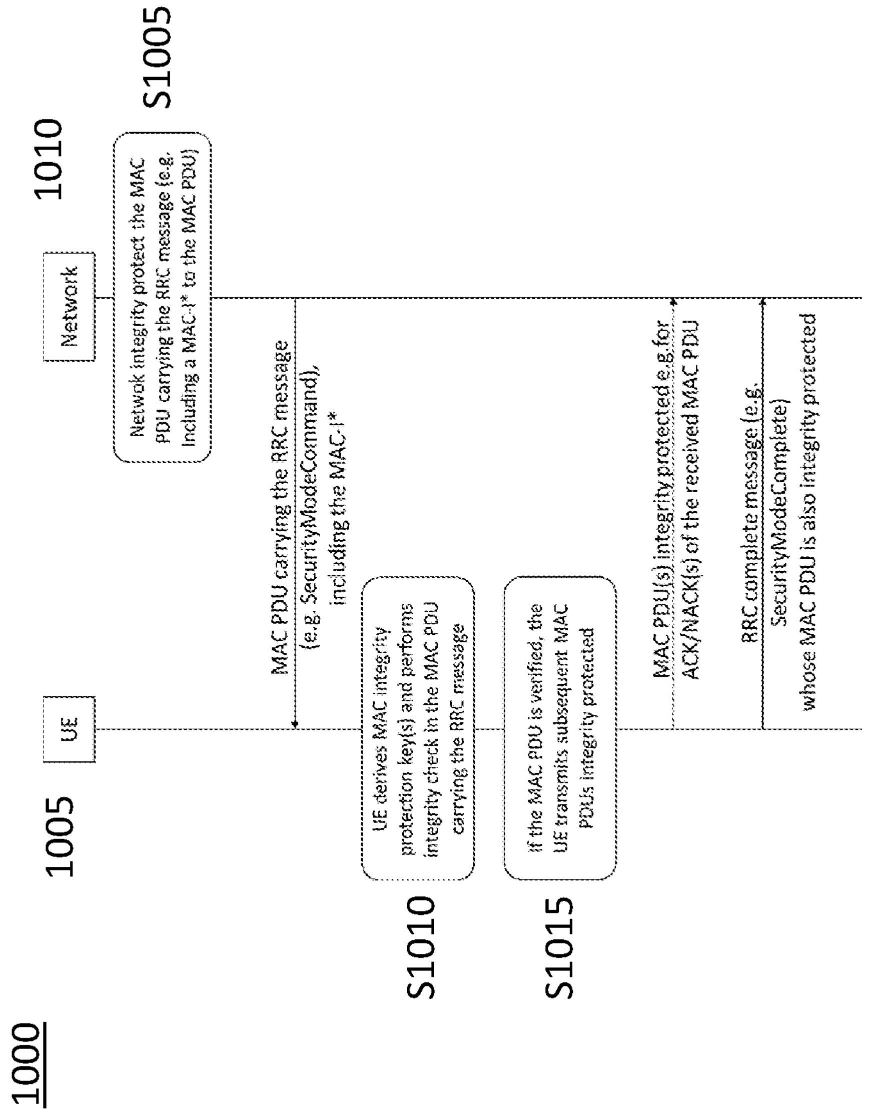
FIG. 10 illustrates a method in which subsequent MAC PDUs are integrity protected according to some embodiments of the disclosed subject matter.
Figure 11:
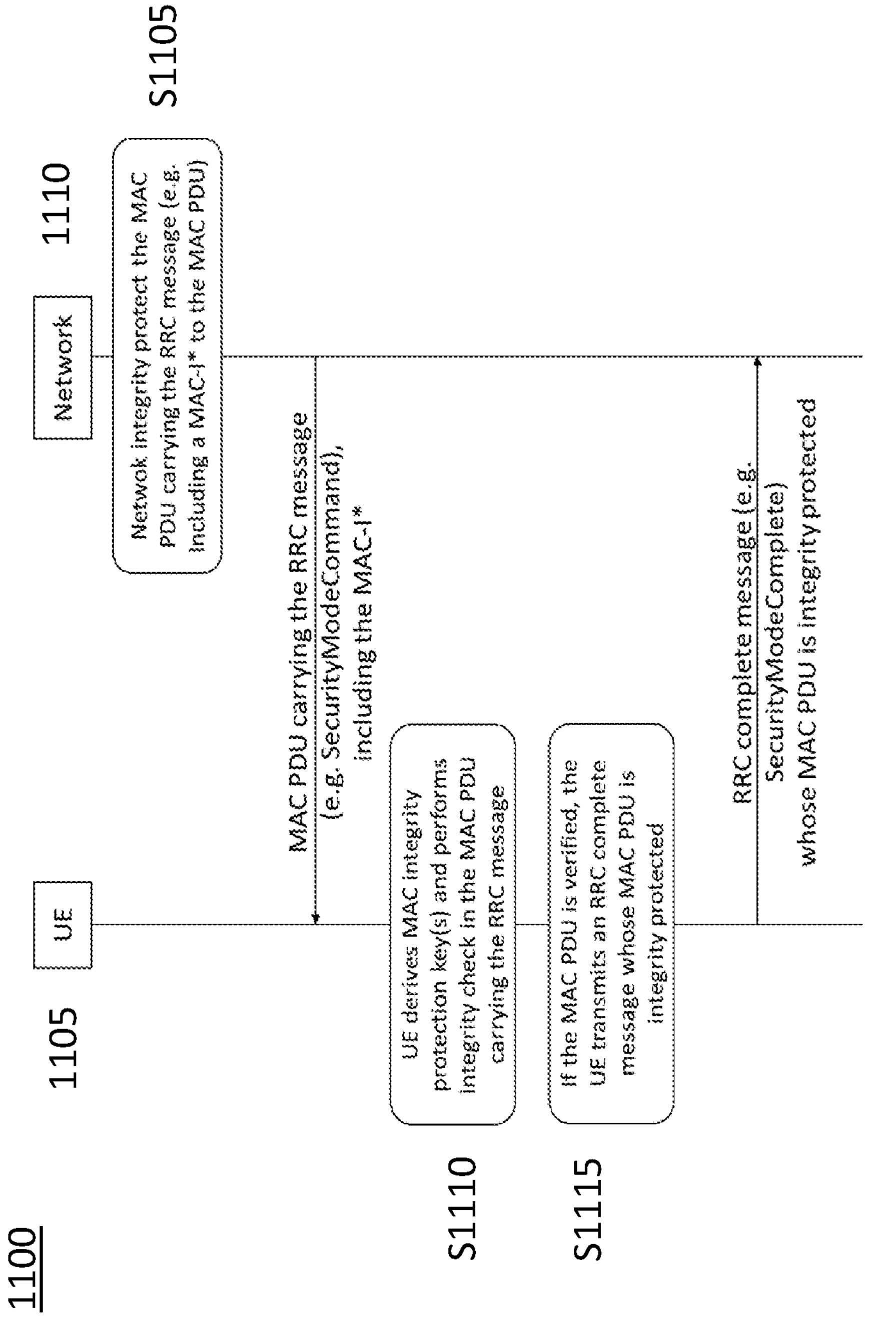
FIG. 11 illustrates a method in which a MAC PDU including an RRC complete message is integrity protected according to some embodiments of the disclosed subject matter.

In a second variant, illustrated in FIG. 10, the first MAC message for which integrity protection in MAC shall be applied is the MAC message(s) encapsulating the RRC message to be transmitted in response to the SecurityModeCommand (e.g., SecurityModeComplete message), and, after that, integrity protection in MAC shall be applied to all subsequent MAC messages received and sent by the UE or at least to all subsequent MAC messages that are meant to be integrity protected (e.g., in case only a subset of MAC messages are to be protected). At the network node, upon reception of the first integrity protected MAC PDU, the network verifies the UE and considers MAC security activated.

In a third variant, whether the first or the second variant shall be performed by the UE is based on a configuration received in the RRC message.

The UE configuring lower layers (e.g., the MAC layer) to apply ciphering/encryption using an indicated algorithm for MAC layer ciphering/encryption and the at least one MAC ciphering key ($K_{MACEnc}$).

In a first variant, this operation is performed immediately after the check, i.e., ciphering/encryption in the MAC layer is applied to all subsequent MAC messages received and sent by the UE after the reception of the MAC PDU containing the RRC message during MAC security activation (e.g., SecurityModeCommand), which includes the MAC messages to be transmitted by the UE in response to the MAC PDU carrying the RRC message in the initial security activation, e.g., the MAC messages possibly containing the RLC Acknowledgements (ACK/NACKs) to be transmitted to the network would be ciphered/encrypted.

In a second variant, this operation is performed only after completing the RRC procedure, i.e., ciphering/encryption shall be applied to all subsequent MAC messages received and sent by the UE only after the UE has transmitted the MAC PDU including the RRC message in response to the SecurityModeCommand message (e.g., after SecurityModeCommand). In other words, the MAC PDU carrying the response message is not encrypted, but only MAC message transmitted after that one.

In a third variant, whether the first or the second variant shall be performed by the UE is based on a configuration received in the RRC message.

The UE performing actions associated to the PDPC security, such as one or more of the following:

The UE derives the integrity key for PDCP user plane ($K_{UPint}$) associated with the integrityProtAlgorithm indicated in the SecurityModeCommand message. In other words, further keys for PDCP (e.g., User Plane) are only derived if the RRC message is verified at the MAC layer;

The UE configures lower layers (e.g., PDCP) to apply SRB integrity protection using the indicated algorithm and the $K_{RRCint}$ key immediately, i.e., integrity protection shall be applied to all subsequent messages received and sent by the UE, including the SecurityModeComplete message.

If both MAC layer and PDPC layer security is to be started, the RRC layer indicates for each layer that the layer needs to apply encryption and/or integrity protection according to the respective keys derived i.e., PDCP keys and MAC keys.

The UE considering AS security to be activated. In other words, the success in the integrity check of the RRC message in the MAC layer is a criterion for the UE to consider AS security to be activated. In alternative a) shown above, where integrity check for the received RRC message (e.g., SecurityModeCommand) are performed both at PDCP layer and MAC layer at the UE, AS security is only considered activated if the RRC message (e.g., SecurityModeCommand message) passes the integrity protection check at both the MAC layer and the PDCP layer.

The UE submitting an RRC response message (e.g., SecurityModeComplete) message to lower layers for transmission, upon which the UE considers that the RRC procedure ends.

Still according to the second group of embodiments, if the RRC message (e.g., SecurityModeCommand message) does NOT pass the integrity protection check performed at the MAC layer one of more of a second set of actions are performed:

The UE transmitting an indication to the network indicating a security failure to the MAC layer;

The integrity check being performed at the MAC layer internally at the UE. Hence, if he the MAC layer at the UE determines that the integrity check fails for the received MAC PDU, the MAC layer indicate the integrity verification failure to upper layers (e.g., to RRC).

Figure 12:
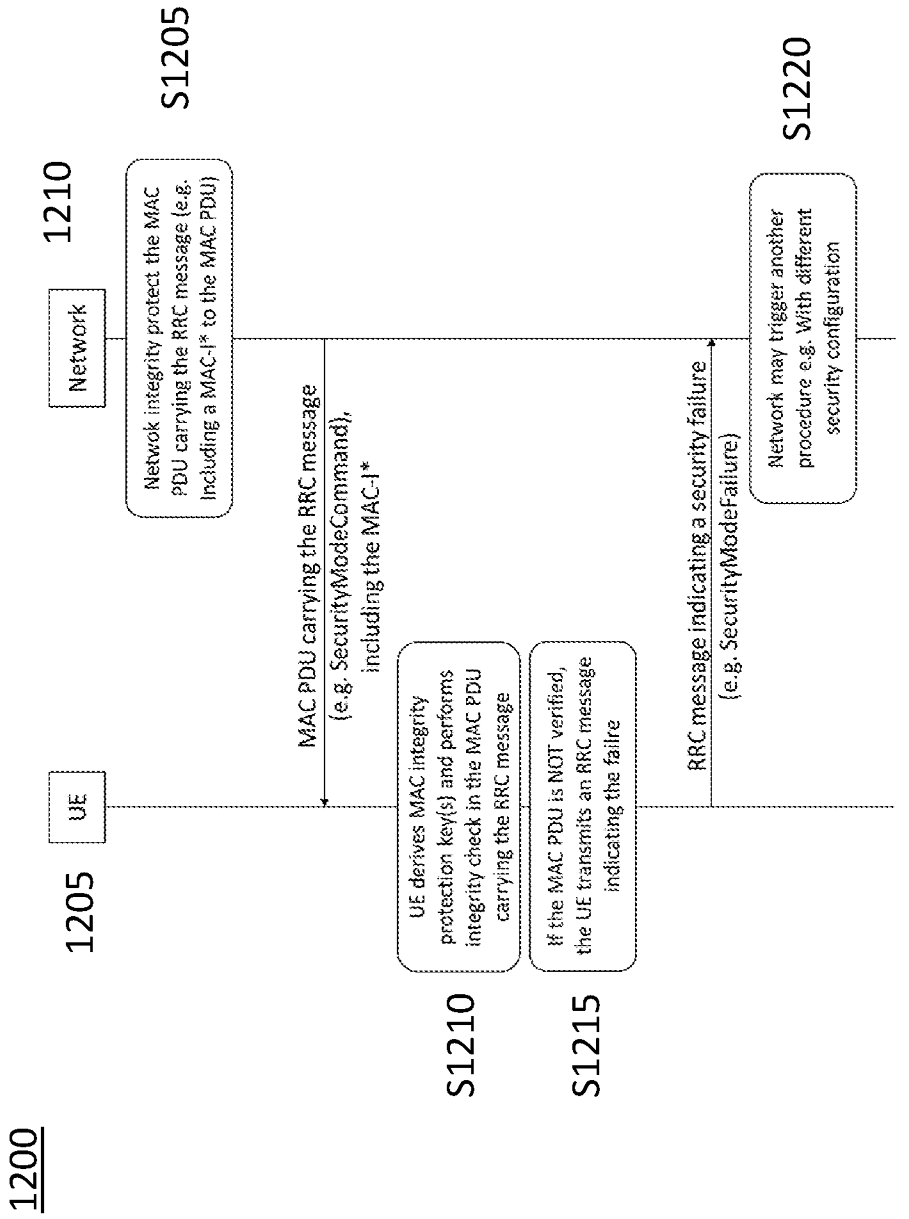
FIG. 12 illustrates an example of operations to be performed if an RRC message passes an integrity check at a PDCP layer but does not pass an integrity check at a MAC layer, according to some embodiments of the disclosed subject matter.

If the RRC message passing the integrity protection check performed at the PDCP layer, but does not pass integrity protection check in MAC layer (assuming alternative (a), wherein both checks are performed):

In a first variant, illustrated in FIG. 12, the UE transmits (or submits to lower layers for transmission) an RRC message indicating a security failure (e.g., SecurityModeFailure message), upon which the procedure ends. In one option, the UE includes in the message an indication (e.g., a cause value) indicating that MAC security has failed, e.g., that the RRC message did not pass the integrity protection check performed at the MAC layer.

In a second variant, the UE transmits (or submits to lower layers for transmission) an RRC message indicating the success of the initial security activation (e.g., SecurityModeComplete message), at least from the PDCP perspective, upon which the procedure ends. In one option, the UE includes in the message an indication (e.g., a cause value) indicating that MAC security has failed, e.g., that the RRC message did not pass the integrity protection check performed at the MAC layer.

In a third variant, the UE transmits a MAC message indicating a security failure at the MAC layer to network.

In one option, that MAC message is a MAC CE (with a specific logical channel identity defined for this purpose). That MAC CE may be included in the MAC PDU including a response RRC message (e.g., SecurityModeComplete or SecurityModeFailure) to be transmitted by the UE in response to the received RRC message (e.g., SecurityModeCommand). The response RRC message may be determine according to criteria defined above e.g., in the first or second variant(s).

In another option, that MAC message is a MAC PDU.

At the network node, upon reception of a message indicating failure, the network node may determine to abort the procedure and/or re-configure the security algorithm(s) of the UE, i.e., triggering a new procedure for initial security activation. The network node may perform a number of trials for this failure case to re-configure the security of the UE and only after a certain number of trials, the network node may decide to abort the procedure, e.g., sending the UE to IDLE state.

If the RRC message does not pass the integrity protection check performed at the PDCP layer, for example, according to alternative a), and does not pass integrity protection check in MAC layer only:

The UE transmits an indication to the network indicating a security failure to both the PDCP and the MAC layer;

In a first variant, the UE transmits (or submits to lower layers for transmission) an RRC message indicating a security failure (e.g., SecurityModeFailure message), upon which the procedure ends. In one option, the UE includes in the message an indication (e.g., a cause value) indicating that both MAC and PDCP security have failed, e.g., that the RRC message did not pass the integrity protection check performed at the MAC layer and at the PDCP layer.

In another variant, the UE transmits a MAC message indicating a security failure at the MAC layer to network.

In one option, that MAC message is a MAC CE (with a specific logical channel identity defined for this purpose). That MAC CE may be included in the MAC PDU including a response RRC message (e.g., SecurityModeFailure) to be transmitted by the UE in response to the received RRC message (e.g., SecurityModeCommand).

In another option, that MAC message is a MAC PDU. An example below is shown for this variant:

At the network node, upon reception of a message indicating failure at the MAC layer, the network node may determine to abort the procedure and/or re-configure the security algorithm(s) of the UE, i.e., triggering a new procedure for initial security activation. In case the network has received an RRC complete message e.g., if PDCP security succeeds and MAC fails, the network may release the UE to IDLE, as a way to abort the transition, so the UE triggers another transition. The network node may perform a number of trials for this failure case to re-configure the security of the UE and only after a certain number of trials, the network node may decide to abort the procedure, e.g., sending the UE to IDLE state.

Still according to the second group of embodiments, in particular with alternative (a), where integrity checks for the received RRC message (e.g., SecurityModeCommand) are performed both at the PDCP layer and the MAC layer, if the RRC message (e.g., SecurityModeCommand message) does NOT pass the integrity protection check performed at the PDCP layer, but the RRC message (e.g., SecurityModeCommand message) passes the integrity protection check performed at the MAC layer, one of more of a third set of actions are performed:

In a first variant, the UE transmits (or submits to lower layers for transmission) an RRC message indicating a security failure (e.g., SecurityModeFailure message), upon which the procedure ends. In one option, the UE includes in the message an indication (e.g., a cause value) indicating that MAC security was successful, e.g., that the RRC message only did not pass the integrity protection check performed at the PDCP layer. That could be a cause value or the absence of an indication.

In another variant, the UE transmits a MAC message indicating a security failure at the PDCP layer to network.

In one option, that MAC message is a MAC CE (with a specific logical channel identity defined for this purpose). That MAC CE may be included in the MAC PDU including a response RRC message (e.g., SecurityModeFailure, as PDCP fails) to be transmitted by the UE in response to the received RRC message (e.g., SecurityModeCommand).

At the network node, upon reception of a message indicating failure at the MAC layer, the network node may determine to abort the procedure and/or re-configure the security algorithm(s) of the UE, i.e., triggering a new procedure for initial security activation. In case the network has received an RRC complete message e.g., if PDCP security succeeds and MAC fails, the network may release the UE to IDLE, as a way to abort the transition, so the UE triggers another transition.

In a third group of embodiments, in response to deriving at least one integrity protection key for MAC layer messages ($K_{MACInt}$), the UE (e.g., via the RRC layer, which is the protocol layer where the RRC message is received) requests lower layers (internally at the UE e.g., requests the MAC layer) to verify the integrity protection only upon reception of a first MAC message meant to be integrity protected, which may not be the MAC PDU carrying the RRC message which has been received (e.g., Security Mode Command message), but a MAC message received after this RRC procedure. This first MAC message to be received integrity protected may be a MAC message associated to a logical channel identifier configured at the UE (e.g., during bearer configuration via RRC Reconfiguration), wherein the UE receives from the network a configuration indicating that MAC PDU(s) associated to that LCID are to be received integrity protected by the UE and needs to be verified; The MAC message may be a MAC Control Element, a MAC PDU, etc. In this solution, the UE starts the verification of MAC messages using the at least one integrity protection key ($K_{MACInt}$) but the first MAC message to be verified is not necessary the MAC message the UE has just received during the RRC procedure to initiate MAC security.

In some embodiments, at least one integrity protection key for MAC layer messages ($K_{MACInt}$) is derived by the UE (and by the network node) based on an integrity protection algorithm for the MAC layer security indicated in the RRC message (e.g., in the Security Mode Command message).

- In a first variant, that integrity protection algorithm for the MAC layer security is indicated in the same configuration (same fields/parameters/Information Elements) for the integrity protection algorithm for PDCP, included in the RRC message (e.g., SecurityModeCommand) i.e., the same integrity protection algorithm would be used for the PDCP security and the MAC security, and the existing configuration would be used for both MAC and PDPC layers. For example, the parameter integrityProtAlgorithm and IE IntegrityProtAlgorithm in SecurityModeCommand indicates the single integrity protection algorithm to be used in deriving integrity protections key(s) in the MAC layer and in the PDCP layer.
- In a second variant, the integrity protection algorithm for the MAC layer security is indicated in a configuration which differs from the integrity protection algorithm configuration included in the message for the security activation at the PDCP layer (even though the same algorithm could possibly be configured at the UE by the network). This means that there would be two different parameters (which does not preclude a setting to the same value for the different parameters). Having such differentiation gives flexibility of which algorithms to support in MAC and PDCP layer. For example, because of cost reasons, it may be prudent that the MAC layer implements few algorithms, while the PDCP layer implements more algorithms. Or, among a set of algorithms, some may be implemented by the MAC layer and some by the PDCP layer so that there is no need for duplicate implementation in both the layers. Such a differentiation, in certain hardware/software design, could also allow parallelizing the cryptographic operations, e.g., using different hardware/software accelerators for different algorithms. For example, calculation and verification of MAC-I* in MAC layer and MAC-I in PDCP layer could be optimized to become faster. In another example, different radio bearers could have different algorithm for the MAC layer security, even though the PDCP layer security has a single algorithm; thus, MAC layer security could be parallelized.
- In a third variant, some other transformation (like a cryptographic hash function), instead of an integrity algorithm, is indicated in the configuration. Example of such hash functions are HMAC (hash-based message authentication code) like HMAC-SHA-256. In this variant, the said transformation could be standardized so that both parties know it beforehand and there is no need to explicitly signal it in the configuration.
- The fact that different parameters may be used for configuring the integrity protection algorithm for MAC security and for PDCP security does not preclude the usage of a common pool of algorithms the UE needs to implement. In other words, the same list of algorithms may exist for MAC and for PDCP, and it would be up to the network to decide which one to configure for each of the layers, including the possibility to configure the same algorithm for both MAC and PDCP.

In another embodiment, at least one encryption/ciphering key for MAC layer messages ($K_{MACEnc}$) is derived based on at least one encryption/ciphering algorithm for the MAC layer security indicated in the RRC message (e.g., in the Security Mode Command message).

- In a first variant, the encryption/ciphering algorithm for the MAC layer security indicated in the RRC message is indicated in the same configuration (same fields/parameters/Information Elements) for the encryption/ciphering for PDCP, included in the RRC message (e.g., SecurityModeCommand) i.e., the same ciphering/encryption algorithm would be used for the PDCP security and the MAC security, and the existing configuration would be used for both MAC and PDPC layers. For example, the parameter cipheringAlgorithm and the IE CipheringAlgorithm in SecurityModeCommand indicates the single ciphering/encryption algorithm to be used in deriving ciphering key(s) in the MAC layer and in the PDCP layer.
- In a second variant, the encryption/ciphering algorithm for the MAC layer security is indicated in a configuration which differs from the encryption/ciphering algorithm configuration included in the message for the security activation at the PDCP layer (even though the same algorithm could possibly be configured at the UE by the network). This means that there would be two different parameters (which does not preclude a setting to the same value for the different parameters). Such a differentiation of encryption/ciphering algorithms could have same benefits as described for the integrity algorithms.
- The fact that different parameters may be used for configuring the ciphering/encryption algorithm for MAC security and for PDCP security does not preclude the usage of a common pool of algorithms the UE needs to implement. In other words, the same list of algorithms may exist for MAC and for PDCP, and it would be up to the network to decide which one to configure for each of the layers, including the possibility to configure the same algorithm for both MAC and PDCP.

The network determines which MAC security algorithms (transformations, MAC layer integrity protection and/or MAC layer encryption/ciphering) are supported by the UE based on the UE security capabilities. The UE reports UE security capabilities for MAC layer security as part of the capability report (see further details in the next section).

In some embodiments, the UE transmits to the network, e.g., such as to the Authentication and Mobility (AMF) or base station (gNodeB) or another network node responsible for the UE capabilities and/or security, at one or more indication(s) of a security capability associated to MAC layer security. Upon reception, the network considers the at least one capability as part of the UE context and/or part of the security context and/or part of the AS security context. The one or more indication(s) of a security capability associated to MAC layer security may be one or more of the following, for example:

- At least one indication that ciphering/encryption in the MAC layer is supported.
  - This may be relevant if ciphering/encryption in the MAC layer is an optional feature;
  - There could be one indication, or multiple indications. In the case of multiple indication, there may be indication per MAC message type (e.g., MAC CE of a first type or second type, MAC CEs and MAC PDUs) and/or direction (MAC message in the downlink, MAC message in the Uplink. For example, it may be optional to cipher/encrypt different types of MAC CEs (e.g., associated to different logical channel identifiers) and the UE can indicate that is capable of ciphering/encryption of a MAC CE of a second type, and vice versa.
- At least one indication of ciphering/encryption algorithm(s) supported for the MAC layer, such as a list of supported algorithms. There may be mandatory algorithms the UE shall support, and the network is aware of i.e., would not need to be signaled.
- At least one indication that integrity protection in the MAC layer is supported, such as a list of supported algorithms.
  - This may be relevant if integrity protection in the MAC layer is an optional feature;
  - There could be one indication, or multiple indications. In the case of multiple indications, there may be indication per MAC message type (e.g., MAC CE of a first type or second ty pe, MAC CEs and MAC PDUs) and/or direction (MAC message in the downlink, MAC message in the Uplink. For example, it may be optional to integrity protect/verify integrity of different types of MAC CEs (e.g., associated to different logical channel identifiers) and, the UE can indicate that is capable of integrity protect/verify integrity of a MAC CE of a second type, and vice versa.

In some embodiments, the configuration for MAC security indicates which MAC messages or MAC message types (e.g., certain MAC CEs, messages in certain associated logical channels) are to be security protected (integrity protection and/or ciphering). In another embodiment, the configuration indicates that which content that goes into the MAC layer determines if MAC security is to be activated or not, e.g., only certain radio bearer types, data radio bearer (DRB) or signaling radio bearer (SRB), are to be security protected.

In some embodiments, the key associated to a network node ($K_{Node}$) corresponds to the key associated to a RAN network node, e.g., a gNodeB. In a first option, the key is the $K_{gNB}$ as defined in TS 33.501, which is also the key used to derive the keys for the PDCP security. This embodiment may be relevant in an architecture at the network side wherein both the MAC layer and the PDCP layer are terminated at the same network nodes/functions and/or implemented in a common location e.g., at a gNodeB or eNodeB.

In another embodiment, the $K_{Node}$ corresponds to any key derived from $K_{gNB}$ through one or multiple derivations.

In some other embodiments, the $K_{Node}$ corresponds to any key derived from a key associated with a core network (e.g., $K_{AMF}$) through one or multiple derivations.

In some embodiments, the RRC procedure is triggered as part of a UE state transition from an IDLE state to a CONNECTED state. The state transition is initiated by the UE by the transmission of an RRC Setup Request message (e.g., RRCSetupRequest), reception of an RRC response for configuring SRB1 (e.g., an RRCSetup) and the transmission of an RRC complete message (e.g., an RRCSetupComplete). Then, after the exchange of NAS messages, the UE receives from the RAN (e.g., from the gNodeB) the RRC message for initial security activation in the AS, such as the Security Mode Command message (e.g., SecurityModeCommand). Hence, the initial security activation is initiated by the network.

In some other embodiments, the security keys for use in the MAC layer, derived during the RRC procedure according to the method, are deleted/released/removed in response to a message indicating the UE to transition to an IDLE state. The message may correspond to an RRC Release message such as RRCRelease as defined in TS 38.331, or an RRC Reconfiguration message indicating the release of the RRC connection. The security keys for use in the MAC layer may correspond to the at least one encryption/ciphering key for MAC layer messages ($K_{MACEnc}$) and at least one integrity protection key for MAC layer message ($K_{MACInt}$).

Figure 13:
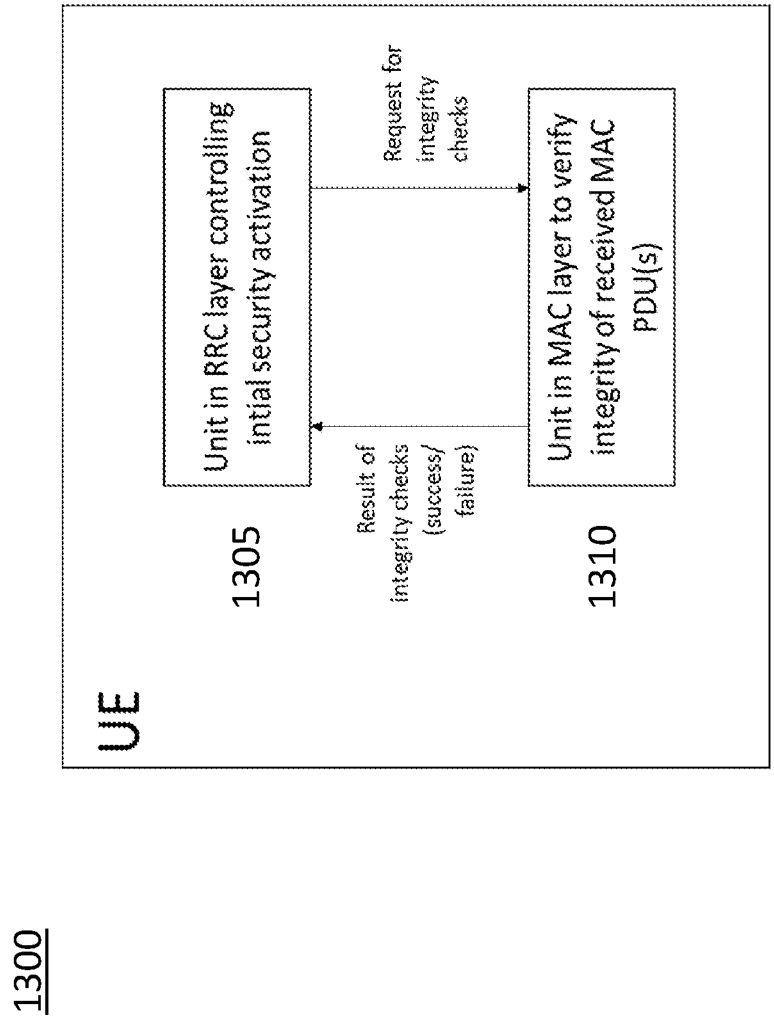
FIG. 13 illustrates a UE with units for MAC security activation, according to some embodiments of the disclosed subject matter.

FIG. 13 illustrates a UE 1300 according to some embodiments of the disclosed subject matter.

Referring to FIG. 13, UE 1300 comprises processing circuitry (e.g., a unit 1305) configured to perform operations in an RRC layer to control initial security activation. UE 1300 further comprises processing circuitry (e.g., a unit 1310) configured to perform operations in a MAC layer to verify integrity of received MAC PDUs, and to produce indications from the MAC layer to the RRC layer for the results of integrity verification check(s) e.g., success or failure.

While the disclosed subject matter has been presented above with reference to various embodiments, it will be understood that various changes in form and details may be made to the described embodiments without departing from the overall scope of the disclosed subject matter.

The invention claimed is:

1. A method performed by a user equipment (UE), comprising:

receiving a first message for initial Access Stratum (AS) security activation via a higher layer protocol, wherein the first message includes configuration information for security in a lower layer protocol responsible for radio resource allocation, wherein the first message is included in a second message of the lower layer protocol;

in response to receiving the first message, deriving an integrity key for the lower layer protocol based on the configuration information; and performing an integrity check on the second message based on the derived integrity key.

2. The method of claim 1, wherein the higher layer protocol is a Radio Resource Control (RRC) protocol, the lower layer protocol is a Medium Access Control (MAC) protocol, and the second message comprises a MAC protocol data unit (PDU).

3. The method of claim 1, further comprising:
determining whether the integrity check failed; and
in response to determining that the integrity check failed, performing at least one of:
transmitting a Radio Resource Control (RRC) message indicating a security failure;
transmitting an indication to the network indicating a security failure to the Medium Access Control (MAC) layer; and
performing an integrity check at the MAC layer internally at the UE.

4. The method of claim 1, further comprising:
determining whether the integrity check succeeded; and
in response to determining that the integrity check succeeded, performing one or more of:
transmitting at least one subsequent Medium Access Control (MAC) protocol data unit (PDU) with integrity protection; and
receiving at least one subsequent Medium Access Control (MAC) protocol data unit (PDU) with integrity protection.

5. The method of claim 4, further comprising:
in response to determining that the integrity check succeeded, transmitting a Radio Resource Control (RRC) complete message within a MAC PDU that is integrity protected using a MAC-I* calculated according to the derived integrity key.

6. The method of claim 1, wherein the configuration information comprises an indication of at least one integrity protection algorithm for Medium Access Control (MAC) layer security, and/or an indication of at least one encryption and/or ciphering algorithm for the MAC layer security.

7. The method of claim 6, further comprising:
deriving a key associated with a network node, to be used at least for MAC layer security; and
deriving the at least one integrity protection key for the lower layer protocol, which is a MAC layer protocol, based on the key associated with the network node and the indication of at least one integrity protection algorithm for the MAC layer security.

8. The method of claim 6, further comprising:
deriving a key associated with a network node, to be used at least for MAC layer security; and
deriving at least one encryption key for MAC layer messages based on the key associated with the network node and the indication of at least one encryption and/or ciphering algorithm.

9. The method of claim 8, further comprising:
transmitting at least one MAC layer message that has been encrypted using the at least one encryption key for MAC layer messages and/or
receiving at least one MAC layer message and decrypting it using the at least one encryption key for MAC layer messages.

10. A method performed by a network node, comprising:
transmitting a first message to a user equipment (UP) for initial Access Stratum (AS) security activation via a higher layer protocol, wherein the first message includes configuration information for security in a lower layer protocol responsible for radio resource allocation, and the first message is included in a second message of the lower layer protocol;
deriving an integrity key for the lower layer protocol based on the configuration information included in the first message; and
integrity protecting the second message based on the derived integrity key.

11. The method of claim 10, wherein the higher layer protocol is a Radio Resource Control (RRC) protocol, the lower layer protocol is a Medium Access Control (MAC) protocol, and the second message comprises a MAC protocol data unit (PDU).

12. The method of claim 11, further comprising:
in response to a user equipment (UE) failing an integrity check on the second message, receiving an RRC message indicating a security failure.

13. The method of claim 11, further comprising:
in response to a user equipment (UE) successfully performing an integrity check on the second message, receiving an RRC complete message having an integrity protected MAC PDU.

14. The method of claim 10, wherein the configuration information comprises an indication of at least one integrity protection algorithm for Medium Access Control (MAC) layer security, and/or an indication of at least one encryption and/or ciphering algorithm for the MAC layer security.

15. A user equipment (UE) comprising:
processing circuitry and memory collectively configured to perform operations comprising:
receiving a first message for initial Access Stratum (AS) security activation via a higher layer protocol, wherein the first message includes configuration information for security in a lower layer protocol responsible for radio resource allocation, wherein the first message is included in a second message of the lower layer protocol;
in response to receiving the first message, deriving an integrity key for the lower layer protocol based on the configuration information included in the first message; and
performing an integrity check on the second message based on the derived integrity key.

16. The UE of claim 15, wherein the higher layer protocol is a Radio Resource Control (RRC) protocol, the lower layer protocol is a Medium Access Control (MAC) protocol, and the second message comprises a MAC protocol data unit (PDU).

17. The UE of claim 15, wherein the operations further comprise:
determining whether the integrity check failed; and
in response to determining that the integrity check failed, performing at least one of:
transmitting a Radio Resource Control (RRC) message indicating a security failure;
transmitting an indication to the network indicating a security failure to the Medium Access Control (MAC) layer; and
performing an integrity check at the MAC layer internally at the UE.

18. The UE of claim 15, wherein the operations further comprise:
determining whether the integrity check succeeded; and
in response to determining that the integrity check succeeded, performing one or more of:
transmitting at least one subsequent Medium Access Control (MAC) protocol data unit (PDU) with integrity protection; and receiving at least one subsequent Medium Access Control (MAC) protocol data unit (PDU) with integrity protection.

19. The UE of claim 18, wherein the operations further comprise:

in response to determining that the integrity check succeeded, transmitting a Radio Resource Control (RRC) complete message within a MAC PDU that is integrity protected using a MAC-I* calculated according to the derived integrity key.

20. A network node comprising:

processing circuitry and memory collectively configured to perform operations comprising:

transmitting to a user equipment (UE) a first message for initial Access Stratum (AS) security activation via a higher layer protocol, wherein the first message includes configuration information for security in a lower layer protocol responsible for radio resource allocation, and the first message is included in a second message of the lower layer protocol;

deriving an integrity key for the lower layer protocol based on the configuration information included in the first message; and integrity protecting the second message based on the derived integrity key.

21. The network node of claim 20, wherein the higher layer protocol is a Radio Resource Control (RRC) protocol, the lower layer protocol is a Medium Access Control (MAC) protocol, and the second message comprises a MAC protocol data unit (PDU).

22. The network node of claim 21, wherein the operations further comprise:

in response to a user equipment (UE) failing an integrity check on the second message, receiving an RRC message indicating a security failure.

23. The network node of claim 21, wherein the operations further comprise:

in response to a user equipment (UE) successfully performing an integrity check on the second message, receiving an RRC complete message having an integrity protected MAC PDU.

24. The network node of claim 20, wherein the configuration information comprises an indication of at least one integrity protection algorithm for Medium Access Control (MAC) layer security, and/or an indication of at least one encryption and/or ciphering algorithm for the MAC layer security.

* * * * *